US010938800B2

(12) United States Patent
Pritchard, Jr.

(10) Patent No.: US 10,938,800 B2
(45) Date of Patent: Mar. 2, 2021

(54) SYSTEM AND METHOD FOR SECURE ACCESS OF A REMOTE SYSTEM

(71) Applicant: Certified Cyber Solutions, Inc., Charleston, SC (US)

(72) Inventor: John Russell Pritchard, Jr., Johns Island, SC (US)

(73) Assignee: BohicketSC, LLC, Charleston, SC (US)

(*) Notice: Subject to any disclaimer, the term of this patent is extended or adjusted under 35 U.S.C. 154(b) by 0 days.

(21) Appl. No.: 16/004,287

(22) Filed: Jun. 8, 2018

(65) Prior Publication Data

US 2019/0014103 A1  Jan. 10, 2019

Related U.S. Application Data

(63) Continuation of application No. 15/095,993, filed on Apr. 11, 2016, now Pat. No. 9,998,447, which is a continuation of application No. 12/940,177, filed on Nov. 5, 2010, now Pat. No. 9,313,196.

(60) Provisional application No. 61/259,030, filed on Nov. 6, 2009.

(51) Int. Cl.
*G06F 21/00* (2013.01)
*H04L 9/00* (2006.01)
*H04L 29/06* (2006.01)

(52) U.S. Cl.
CPC ........ *H04L 63/0815* (2013.01); *H04L 63/083* (2013.01); *H04L 63/0853* (2013.01); *H04L 63/08* (2013.01); *H04L 63/10* (2013.01)

(58) Field of Classification Search
CPC .................................................. H04L 63/0815

USPC .......................................................... 726/4–8
See application file for complete search history.

(56) References Cited

U.S. PATENT DOCUMENTS

| 6,067,623 | A | 5/2000 | Blakley, III et al. |
| 6,128,742 | A | 10/2000 | Felt |
| 7,010,582 | B1 | 3/2006 | Cheng et al. |
| 7,412,720 | B1* | 8/2008 | Frey ...................... H04L 63/168 707/E17.032 |
| 2003/0046587 | A1 | 3/2003 | Bheemarasetti et al. |
| 2005/0086494 | A1 | 4/2005 | Carley |
| 2007/0118891 | A1* | 5/2007 | Buer ...................... G06F 21/445 726/8 |

(Continued)

OTHER PUBLICATIONS

International Search Report and Written Opinion of the International Searching Authority dated Jan. 18, 2011, for corresponding PCT international patent application No. PCT/US2010/055593.

*Primary Examiner* — Alexander Lagor
(74) *Attorney, Agent, or Firm* — Nelson Mullins Riley & Scarborough LLP (57) ABSTRACT

A system and method for providing a user with secure access to devices operatively connected to a network comprising at least one processing device that has access to a database. The database maintains information for each user of the system, such as the user's login credentials and access level or permissions, along with information corresponding to each network device, such as, for example, the device's login credentials, IP address, and port settings. The processing device authenticates each user and then provides each user with access to the network devices as defined by the data maintained in the database corresponding to the respective user and the network devices.

5 Claims, 4 Drawing Sheets

(56) References Cited

U.S. PATENT DOCUMENTS

| | | |
|---|---|---|
| 2007/0192252 A1 | 8/2007 | Shear et al. |
| 2007/0289000 A1 | 12/2007 | Weiss |
| 2008/0046369 A1 | 2/2008 | Wood |
| 2008/0120711 A1 | 5/2008 | Dispense |
| 2009/0217351 A1 | 8/2009 | Burch et al. |
| 2010/0174758 A1 | 7/2010 | Radenkovic et al. |
| 2010/0241753 A1* | 9/2010 | Garbajs ............... H04L 63/0428 709/227 |

* cited by examiner

SYSTEM AND METHOD FOR SECURE ACCESS OF A REMOTE SYSTEM

CROSS-REFERENCE TO RELATED APPLICATIONS

The present application is a continuation of U.S. application Ser. No. 15/095,993, filed Apr. 11, 2016 (now U.S. Pat. No. 9,998,447), which is a continuation of U.S. application Ser. No. 12/940,177, filed Nov. 5, 2010 (now U.S. Pat. No. 9,313,196), which claims the benefit of U.S. provisional patent application Ser. No. 61/259,030, filed on Nov. 6, 2009, and entitled "System and Method for Secure Access of a Remote System," the entire disclosure of each of which is hereby incorporated by reference as if set forth verbatim herein and relied upon for all purposes.

FIELD OF THE INVENTION

The present invention relates generally to secure systems. More particularly, the present invention relates to a system and method for providing secure access to a remote system.

BACKGROUND OF THE INVENTION

The rapid growth in devices capable of connecting to a network and their increasingly vital role in day-to-day operations has created a need for the ability to easily manage, access, and service these devices. The functionality of these devices has created a need to provide external access to the network that was not previously required. This access comes with both substantial advantages and inherent security weaknesses.

The network devices no longer merely exist in a highly controlled environment, but are ubiquitous in everyday life. They exist in homes, medical offices, retirement communities, hotels, apartment buildings, yachts, airplanes, and virtually anywhere humans live or work. By their very nature, these devices require exposing the network to previously unpermitted security vulnerabilities in order to support their functionality. An example of this would be the port forwarding that is required to permit external access to an internet protocol ("IP") device, such as a digital video recorder ("DVR") or IP camera, as well as the network services that support these devices. This increased opening of ports provides a larger target for common network vulnerability scanning tools.

In computer networking, a port is an application-specific or process-specific software construct serving as a communications endpoint used by transport layer protocols of the internet protocol suite, such as the transmission control protocol ("TCP") and the user datagram protocol ("UDP"). A specific port is identified by its number, commonly known as the port number, the IP address with which it is associated, and the protocol used by the port for communication.

For example, Nmap is a "Network Mapper" used to discover computers and services on a computer network, thus creating a "map" of the network. Just like many simple port scanners, Nmap is capable of discovering passive services on a network despite the fact that such services aren't broadcasting themselves with a service discovery protocol. In addition, Nmap may be able to determine various details about the remote computers or devices on the network. Such details may include operating system, device type, uptime, software product used to run a service, exact version number of that product, presence of certain firewall techniques, and, on a local area network, even vendor of the remote network card or interface. This also exposes other devices connected to the network that would not normally be externally-accessible to unnecessary vulnerability. By leaving these additional outside ports open, the risk of one of the devices being compromised is increased.

Devices that are connected to the network and are not normally accessible can now be accessed through the external connection that was intended for a different target device. For example, an unauthorized user exploiting ports left open for a remote desktop protocol could now leverage the access to the remote computer, thereby gaining access to a video camera that was previously only accessible internally.

With the wide variety of manufacturers of network-accessible devices that are entering into the network marketplace, there is yet to be a standard developed for providing access to and management of these devices. This has left each entity who is responsible for managing these networks and the manufacturers who sell the devices to determine and derive their own best practices for network security.

IP devices entering into increasingly vital arenas that have historically had little-to-no interface with the network (e.g., health monitoring devices) raise important personal privacy issues, and the issue of increased uptime and timely servicing has come to the forefront in network management. This phenomenon has created a need for an ever-increasing number of people to have remote access to networks, devices, information, and data. At the same time, however, there are no corresponding standards of accountability in managing this increased access flow that could impact other types of information security standards, such as the Health Insurance Portability and Accountability Act ("HIPAA").

With the increase in IP devices and the need to access and manage their performance, the given number of devices any given administrator is accessing and managing on a daily basis has proportionally increased the burden placed on the administrator. This phenomenon has created a need for a simple-to-use system that can centrally access and manage devices/networks in multiple geographical locations simultaneously by any given amount of concurrent users.

The administrators who manage these network systems face a difficult and ever-increasing problem of how to balance the need for secure passwords for each of these devices versus enabling the user to access devices as part of their daily job or the end-user consumer accessing their IP appliances, which will only become more unmanageable as the growth in IP devices continues to proliferate in the marketplace. The fact that these complex IP device-driven networks and their associated login credentials are not centrally manageable leads to the common practice of developing a password schema that is known to all users or is easily broken by password-guessing software. This practice increases the threat of unauthorized internal access to the device(s) and removes any form of accountability as to who gained access and when they gained access, including unknown access by IP device/appliance manufacturers.

SUMMARY OF THE INVENTION

The present invention recognizes and addresses the foregoing considerations, and others, of prior art construction and methods.

The present invention relates to cyber security, and particularly to network security and the security risks posed by authorized end-users, unauthorized end-users, and common hacking tools. One aspect of the present invention is directed to a method, system, and computer program, or "web application," for logging in a user to any given network device, without granting the user the ability to gain knowledge of that device's login credentials. Regarding internet and network security, one aspect of the present invention minimizes the network exposure of the device(s) by minimizing the unnecessary amount of open ports exposed to the Internet to just one open port in one embodiment.

Another aspect of the present invention relates to a unique gateway that allows for a user who has been authenticated onto the system to navigate multiple, simultaneous devices and corresponding networks without the need to login/authenticate into each device separately. One embodiment of the invention provides a unique capability of offering a single location for device-specific resources, such as a manufacturer's digitally stored, web-accessible user manuals or photos of the device in its environment and/or physical location.

In this regard, one aspect of the invention provides a method, system, and computer program or web application for automating remote or local network device login/authentication, providing a masked login/authentication to remote and local devices on behalf of a user to devices to which the user has been granted access, while masking authentication credentials, access IP, and port information from the user, and securely storing and managing device login/authentication credentials within network monitoring software.

One embodiment of the system comprises a database configured to store data representative of device login/authentication credentials, access IP, and port information that, once securely authorized, grants the user an appropriate and corresponding level of permissible access to the device(s). A single login to the network monitoring software per user validates the user's credentials and grants the appropriate level of access to the database.

When a user requests access to a device, the request is forwarded to the database via a secure communication path, and then the appropriate device credentials are passed to the device via a dynamically created secure communication path, the endpoint of which is automatically defined by masked data within the database so that the user does not gain knowledge of the device's login/authentication credentials, IP access, or port setting(s). A single login provides the user with the ability to navigate multiple, simultaneous devices/locations without the need to log into each device or location separately with credentials, because the web application serves as the user's proxy and includes the credentials in the web application's database. The method, system, and web application minimize the exposure of the remote device(s) by minimizing the necessary amount of open ports exposed to the Internet. The method, system, and web application provide a unique capability of offering a single location for device-specific resources, such as a manufacturer's digitally stored and web-accessible user manuals.

According to another aspect, the present invention also provides a system and method for protecting and securing the network and the devices that reside on the network from multiple forms of access. By centralizing password management and device access, while, at the same time, masking the particular login credentials from various users, an administrator is able to manage individual user permissible access. This eliminates the real world scenario of the rogue employee, using their credentials, to gain unpermitted access to network devices. The current system relies on an honor system, because each user is given the passwords to network devices and there is no manageable way to revoke this information once the password schema has been developed. For instance, an IP router manufactured by a company is generally configured by that company with a default username and password. It is unfeasible to remove that information from the knowledge of users who no longer need access to the router but may have legitimately at some point.

A common practice of hackers is to do a network vulnerability scan, which searches for open ports and their associated services or devices. One aspect of the present invention drastically reduces the exposure to these scans by handling all port forwarding internally through a dynamically secure tunnel, allowing the administrator to close other extraneous ports, and thereby reducing the profile of the network to the hacker. This also drastically reduces the ability of someone externally accessing any network device outside of the protected system.

An additional feature of the invention is a gateway, through which the use of a single login enables the end-user, technician, and/or administrator to securely and seamlessly log into multiple networks and/or devices simultaneously, regardless of their physical locations. This greatly streamlines the workflow of the administrator, who is managing various networks and multiple devices across a wide geographical area, as well as end-users and technicians who commonly access multiple IP devices through the course of their day.

Another feature of the invention is that field technicians or other users will now have the ability to access user manuals, photos of the device, and/or a manufacturer's website (or any other desired information that can be arranged in a web page format) from a centralized location within the system's web application.

Other objects and advantages of the present invention will be set forth in part in the description and in the drawings which follow and, in part, will be obvious from the description, or may be learned by practice of the invention.

The above advantages and features are of representative embodiments only, and are not exhaustive and/or exclusive. They are presented only to assist in understanding the invention. It should be understood that they are not representative of all the inventions disclosed herein or defined by the claims, to be considered limitations on the invention as defined by claims, or limitation on equivalents to the claims. For instance, some of these advantages may be mutually contradictory, in that they cannot be simultaneously present in a single embodiment. Similarly, some advantages are applicable to one aspect of the invention and may be inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
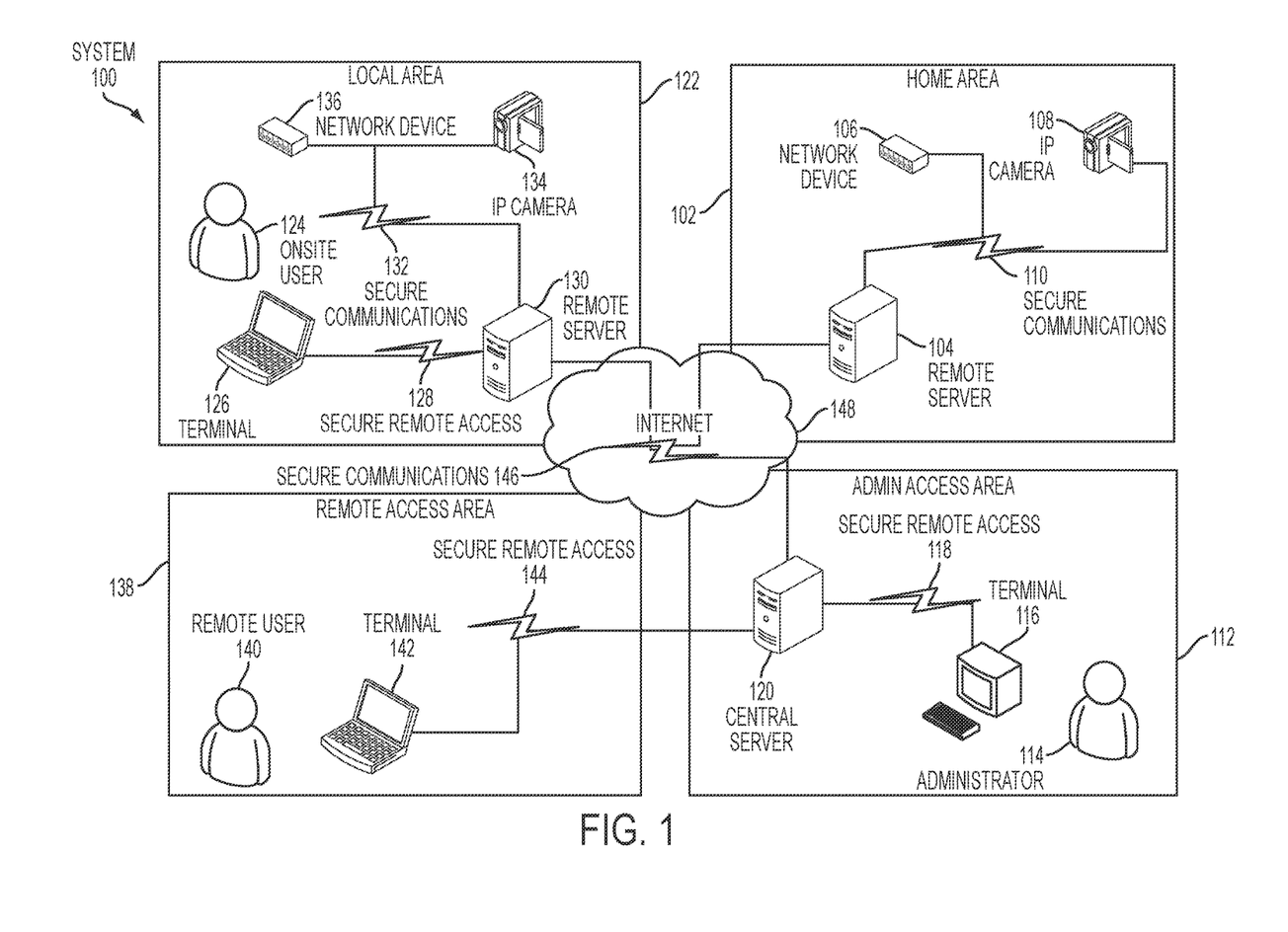
FIG. 1 is a diagrammatic representation of a multi-location networked computing environment in accordance with an embodiment of the present invention.

FIG. 1 is a diagrammatic representation of a multi-location networked computer environment or system 100 combining remote access and device authentication in accordance with an embodiment of the present invention. Referring to FIG. 1, system 100 comprises a home area 102, an admin access area 112, a local area 122, and a remote access area 138.

Home area 102 comprises a remote server 104 and at least one network device 106. Network device 106 is a device capable of communicating via a network with remote server 104, such as video game consoles, DVD and Blu-Ray players, high definition televisions, refrigerators, washers and dryers, etc. That is, network device 106 may be any IP-addressable appliance, such as an IP camera 108. Remote server 104 connects to these devices via secure communication path 110. Secure communication path 110 may be any suitable secure communication path or technology allowing devices on the network, such as devices 106 and 108, and remote server 104 to exchange data in a secure manner. For instance, secure communication path 110 may be a secure shell ("SSH") or any other secure network protocol that allows data to be exchanged using a secure channel between two networked devices.

Admin access area 112 comprises an administrator 114, a terminal 116, and a central server 120. Administrator, or "admin," may be defined as the network administrator responsible for the maintenance of computer hardware and software that comprises a computer network. This responsibility normally includes the deployment, configuration, maintenance, and monitoring of active network equipment, as well as assigning user and device login credentials and user levels of permissible access. User levels of permissible access may be defined as to how the administrator groups individual users and what restrictions and/or abilities are placed on the group as a whole with reference to how much information and/or access the users can glean from the network, device, and/or appliance. For example, administrator 114 may choose to assign groups such as, but not limited to, engineer, programmer, field technician, consumer end-user, etc., and, thus, grant each group only the access they require for their roles and functionality within the network environment, but no more than necessary as a means of providing security and/or safeguards against unintentional mishaps.

Terminal 116 and central server 120 are computer systems operatively connected by a network via a secure remote access path 118. Remote access path 118 may be any secure communication path, but is preferably Remote Desktop Protocol ("RDP") over a virtual private network ("VPN"). As should be understood by those of ordinary skill in the art, RDP is the Remote Desktop Protocol developed and provided by the Microsoft Corporation of Redmond, Wash. It should be further understood that a VPN is a computer network implemented in an additional software layer (overlay) on top of an existing larger network for the purpose of creating a private scope of computer communications or providing a secure extension of a private network into an insecure network such as the Internet.

Local area 122 comprises a terminal 126, a remote server 130, and at least one network device 136, such as an IP camera 134. Local area 122 may be defined as any location consisting of a local area network ("LAN"). Terminal 126 and remote server 130 are operatively connected by a LAN via a secure remote access path 128. Secure remote access path 128 is similar to secure remote access path 118 described above. Devices 136 and 134 are network devices capable of communicating with remote server 130 via a secure communications path 132, similar in the manner by which devices 106 and 108 communicate with remote server 104 via secure communications path 110, as described above. Local area 122 is utilized by an onsite user 124, which may be defined as a person or entity that has been given access and credentials by the admin in order to gain access to remote server 130 and/or terminal 126. Remote server 130 communicates with IP addressable appliances, such as devices 134 and 136, via secure communication path 132.

Remote access area 138 is utilized by a remote user 140, which is similar to onsite user 124 described above. Remote access area 138 comprises a terminal 142 operatively connected to central sever 120 via a secure remote access path 144. Secure remote access path 144 is similar in configuration and operation as secure remote access path 118 described above.

It should be understood by those of ordinary skill in the art that servers 104, 120, and 130 and terminals 116, 126, and 142 are computer systems comprising, among other things, a processing device and memory. Servers 104, 120, and 130 are configured to provide services across a network as described in more detail below with respect to FIG. 2, and may be a server, computer, enterprise server, laptop, or other suitable processing machine as should be understood in the art. Terminals 116, 126, and 142 may be any common mobile or desktop computing device, such as a laptop, personal computer, mobile phone, video game console, etc. It should also be understood that, in certain scenarios, terminals 116 and 126 may be incorporated into or included within servers 120 and 130, respectively. That is, each terminal and the server associated therewith may be combined into the same computing system as should be understood by those in the art.

The processing devices within each computing system may be a processor, microprocessor, controller, microcontroller, or other appropriate circuitry. The associated memory within each computing system may be any type of memory or computer-readable medium as long as it is capable of being accessed by its respective processing device, including random access memory ("RAM"), read-only memory ("ROM"), erasable programmable ROM ("EPROM") or electrically EPROM ("EEPROM"), CD-ROM, DVD, or other optical disk storage, solid state drive ("SSD"), magnetic disk storage, including floppy or hard drives, any type of non-volatile memories, such as secure digital ("SD"), flash memory, memory stick, or any other medium that may be used to carry or store computer program code in the form of computer-executable programs, instructions, or data. Each processing devices may also include a portion of memory accessible only to the processing device, commonly referred to as "cache." Thus, each memory may be part of the respective processing device, may be separate, or may be split between the relevant processing device and a separate memory device.

The memory of the computing devices set forth above comprises computer-executable program code or instructions that, when executed by the respective processing device, perform certain tasks and processes as described in more detail below. Additionally, the memory comprises computer-executable program code, instructions, or codebase that, when executed by the respective processing device, executes a monitoring program, applications, and/or web servers described in more detail below. Additionally, the memories may also comprise one or more data structures for storing information, including the databases described in more detail below. The computer-executable program code or instructions in this scenario, as should be known to those skilled in the art, usually include one or more application programs, other program modules, program data, firmware, and/or an operating system.

Additionally, referring to FIG. 1, system 100 further comprises secure communications path 146, which is similar to the secure communication paths described above, but provides a secure communication path over a wide area network ("WAN"), such as the Internet 148. Secure communication path 146 provides secure communication between central server 120 and remote servers 104 and 130.

Figure 2:
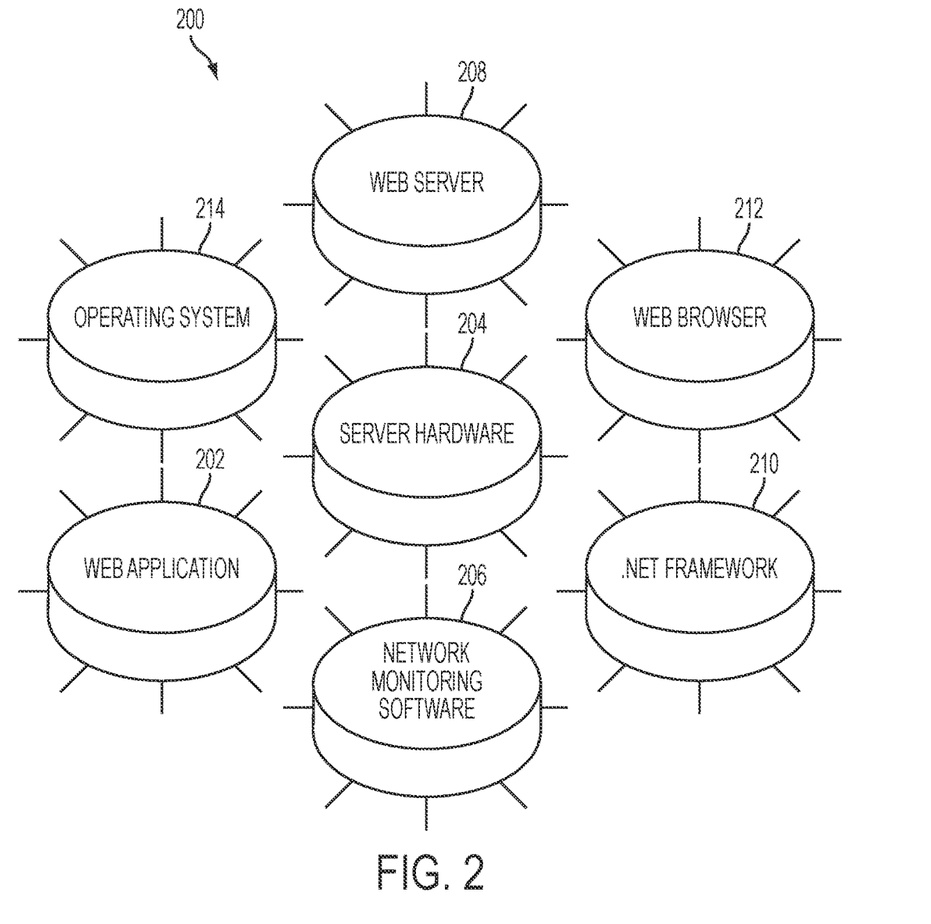
FIG. 2 is a diagrammatic representation of the components of a computer system of the environment of FIG. 1.

FIG. 2 is a diagrammatic representation that illustrates the components contained in a server 200, which may be used as server 104, 120, and/or 130 (FIG. 1). Server 200 comprises one or more of the following modules and components: a web application 202, server hardware 204, network monitoring software 206, a web server 208, a .NET Framework 210, a web browser 212, and an operating system 214.

Web application 202 may be defined as a custom codebase, where the term codebase (or code base) may be defined to mean the whole collection of source code used to build a particular application or component. In one embodiment, the codebase is written in C# (pronounced "C Sharp"), is provided by the Microsoft Corporation, and may be defined as a multi-paradigm programming language encompassing imperative, functional, generic, object-oriented (class-based), and component-oriented programming disciplines. Web application 202 provides underlying functionality of at least one aspect of the invention and acts as a communication server between the different components shown in FIG. 2, whose detailed functionality and communication specifics are set forth below.

In addition to the processing device and memory described above, server hardware 204 additionally comprises a network interface controller ("NIC"). A NIC may be defined as a hardware device that handles an interface to a computer network and allows a network-capable device, such as server 200, to access that network.

Network monitoring software 206 may be any suitable networking monitoring application, such as the DOPPLERVUE product offered by SYS Network Solutions of Alexandria, Va., or the network monitoring software products offered by Level Platforms of Ottawa, Ontario. "Network monitoring" may be used to describe the use of a system that constantly monitors a computer network for slow or failing components and that notifies the network administrator in case of outages via email, pager, mobile phone, or by other alerts or alarms. Commonly measured metrics of such applications are response time and availability (commonly referred to as 'uptime'), although both consistency and reliability metrics are starting to gain popularity. It is a subset of the functions involved in network management. Network monitoring software 206 may be configured to check HTTP pages, HTTPS, SNMP, FTP, SMTP, POPS, IMAP, DNS, SSH, TELNET, SSL, TCP, ping, SIP, UDP, media streaming, and a range of other ports and/or protocols with great variety of check intervals from every 4 hours to every one minute, as should be understood by those of ordinary skill in the art.

Web server 208 may be any suitable web server application, such as Internet Information Services ("IIS") offered by the Microsoft Corporation or the APACHE HTTP SERVER maintained by the Apache Software Foundation of Forest Hill, Md. Web server 208 may be configured to provide one or more of the following services: FTP, FTPS, SMTP, NNTP, and HTTP/HTTPS.

.NET Framework 210 is a library of coded solutions provided by the Microsoft Corporation. .NET Framework 210 is a software framework that may be installed on computers running an operating system provided by the Microsoft Corporation and includes a large library of coded solutions to common programming problems and a virtual machine that manages the execution of programs written specifically for the framework.

.NET Framework 210 comprises a Base Class Library, which includes features, such as user interface, data and data access, database connectivity, cryptography, web application development, numeric algorithms, and network communications. The class library is used by programmers, who combine it with their own code to produce applications, as should be understood. Programs written for the .NET Framework execute in a software environment that manages the program's runtime requirements. Also part of the .NET Framework, this runtime environment is known as the Common Language Runtime ("CLR"). The CLR provides the appearance of an application virtual machine so that programmers need not consider the capabilities of the specific CPU that will execute the program. The CLR also provides other important services, such as security, memory management, and exception handling. The class library and the CLR together constitute the .NET Framework. Version 3.0 of the .NET Framework is included with the WINDOWS SERVER 2008 and WINDOWS VISTA operating systems, both offered by the Microsoft Corporation. The current version of the framework can also be installed on WINDOWS XP, WINDOWS SERVER 2003, and other WINDOWS family of operating systems offered by the Microsoft Corporation. Those of ordinary skill in the art should appreciate that later versions of the .Net Framework provided by the Microsoft Corporation, such as version 4.0, as well as other operating systems, such as the Windows 7 operating system offered by the Microsoft Corporation, may be used instead without departing from the scope of the present invention.

Web browser 212 is a software application for retrieving, presenting, and traversing information resources on the World Wide Web ("WWW") or an internally hosted website. Although browsers are primarily intended to access the World Wide Web, they can also be used to access information provided by web servers in private networks or files in file systems. Web browser 212 may be any suitable web browser, such as INTERNET EXPLORER offered by the Microsoft Corporation, FIREFOX managed by the Mozilla Corporation of Mountain View, Calif., SAFARI offered by Apple Incorporated of Cupertino, Calif., and OPERA offered by Opera Software of Oslo, Norway.

Operating system 214 may be defined as an interface between hardware and a user which is responsible for the management and coordination of activities and the sharing of the resources of the computer that acts as a host for computing applications executed by the system. In one embodiment, operating system 214 is selected from the WINDOWS SERVER family provided by the Microsoft Corporation, but it should be understood that it may be any suitable operating system.

Figure 3:
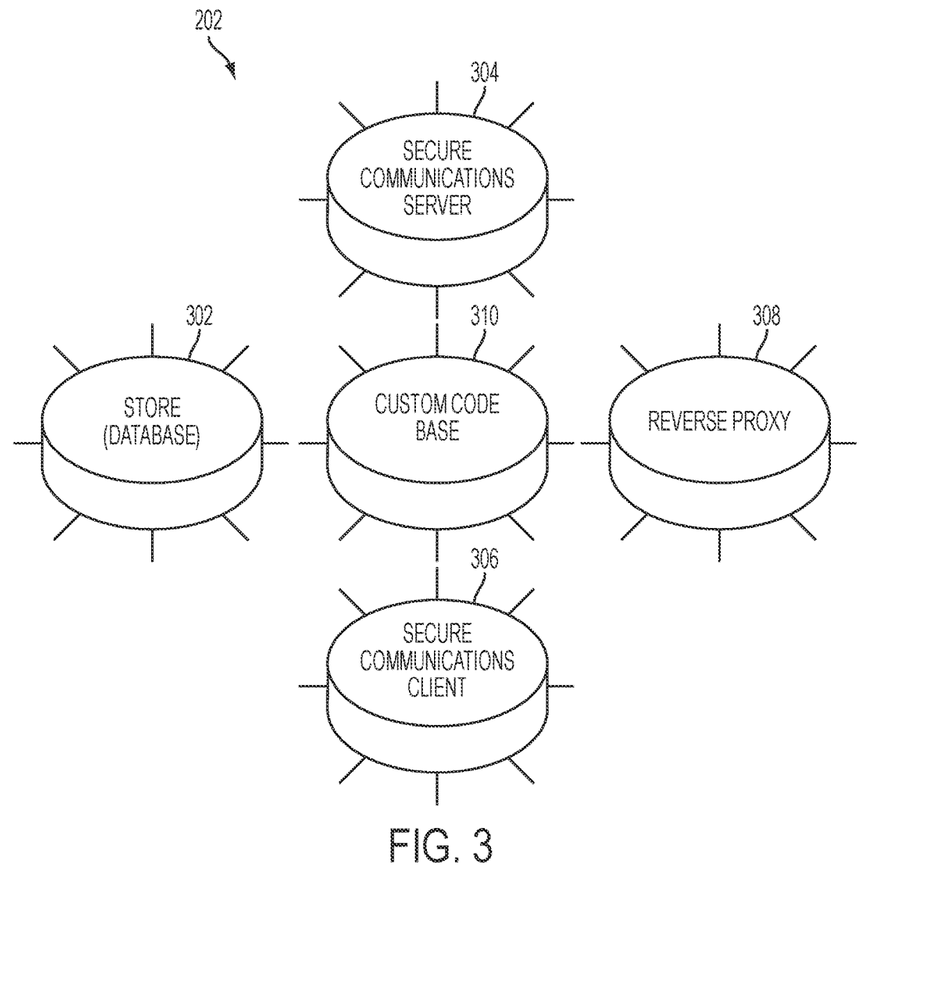
FIG. 3 is a diagrammatic representation of the components of a web application in accordance with an embodiment of the present invention.

FIG. 3 is a diagrammatic representation of the components of web application 202, which comprises a store (or database) 302, a secure communications server 304, a secure communications client 306, a reverse proxy 308, and a custom codebase 310.

Store 302 is a database, which may be defined as an integrated collection of logically related records or files consolidated into a common pool that provides data for one or more multiple uses. In one embodiment, database 302 comprises tables containing records or files of user identities, network monitoring software device identifiers, device locations, device login/authentication credentials, device login methodology, port settings, user login/authentication credentials, user action logs, and/or user's network access level permissions.

The user identities stored in database 302 may be defined as a group, of which each user of the network monitoring software is a part and that corresponds to a level of access and/or restriction as assigned by the administrator, as well as a unique set-up of user credentials, i.e., a username-password combination.

The network monitoring software device identifier may be defined as a unique hexadecimal number that is used by the network monitoring software to identify each unique network device within the network monitoring software.

The device locations may be defined as both the public and private IP address and/or media access control ("MAC") address. A MAC address is a unique identifier assigned to most network adapters or NICs by the manufacturer for identification, and used in the Media Access Control protocol sublayer.

The device login/authentication credentials may be defined as a username and password set. The device login methodology may be defined as one of four HTTP authentication methodologies that determine how the login credentials are presented to the network device. In the context of an HTTP transaction, the basic access authentication is a method designed to allow a web browser, or other client program, to provide credentials—in the form of a username and password—when making a request. For instance, HTTP Digest access authentication is one of the agreed methods a web server can use to negotiate credentials with a web user (using the HTTP protocol). Digest authentication is intended to supersede unencrypted use of the Basic access authentication, allowing user identity to be established securely without having to send a password in plaintext over the network. HTTP+HTML Form based authentication, typically presently colloquially referred to as simply Form based authentication (which in actuality is ambiguous, see form based authentication for further explanation) is a technique whereby a website uses a web form to collect, and subsequently authenticate, credential information from a user agent, typically a web browser wielded by a user. The final HTTP authentication is known as Open HTTP Authentication and refers to devices that do not support a username-password authentication. The user action logs and the user's network access level permission are defined below.

The database's data is encoded natively. That is, it is encrypted by transforming the information, referred to as "plaintext," using an algorithm, or "cipher," to make it unreadable to anyone except those possessing special knowledge, usually referred to as a key, into the tables and deciphered when a query comes in and is not accessible outside of the web application. Databases should be understood by those of ordinary skill in the art and are therefore not discussed in further detail.

Secure communications server 304 may be any suitable secure communication component, such as Open SSH maintained by the OpenBSD Project of Calgary, Alberta, Canada, or COPSSH maintained by ITEF!x Consulting. An SSH server, such as secure communications server 304, is a set of computer programs providing encrypted communication sessions over a computer network using the SSH protocol. Open SSH includes the ability to forward remote TCP ports over a secure tunnel. This is used to multiplex additional TCP connections over a single SSH connection, concealing connections, and encrypting protocols which are otherwise unsecure. A secure communications server should be understood by those of ordinary skill in the art and is therefore not discussed in further detail.

Secure communications client 306 may be any suitable SSH client. An SSH client is a software program which uses the secure shell protocol to connect to a remote computer or SSH server. Secure communications clients should be understood by those of ordinary skill in the art and are therefore not discussed in further detail.

Reverse proxy 308 may be any suitable component that provides a reverse proxy function, as should be understood in the art. A reverse proxy is a proxy server that is installed in a server network and dispatches inbound network traffic to a set of servers or devices, presenting a single interface to the caller. For example, a reverse proxy could be used for load balancing a cluster of web servers. In contrast, a forward proxy acts as a proxy for outbound traffic. Proxy servers should be understood by those of ordinary skill in the art and are therefore not discussed in further detail.

Custom codebase 310 comprises computer code, that when executed by the respective processing device, provides a graphical user interface ("GUI"), an admin management interface, as described above, and communication procedure(s) for the interoperability of the web application components, as described in more detail below with respect to FIG. 4.

Figure 4:
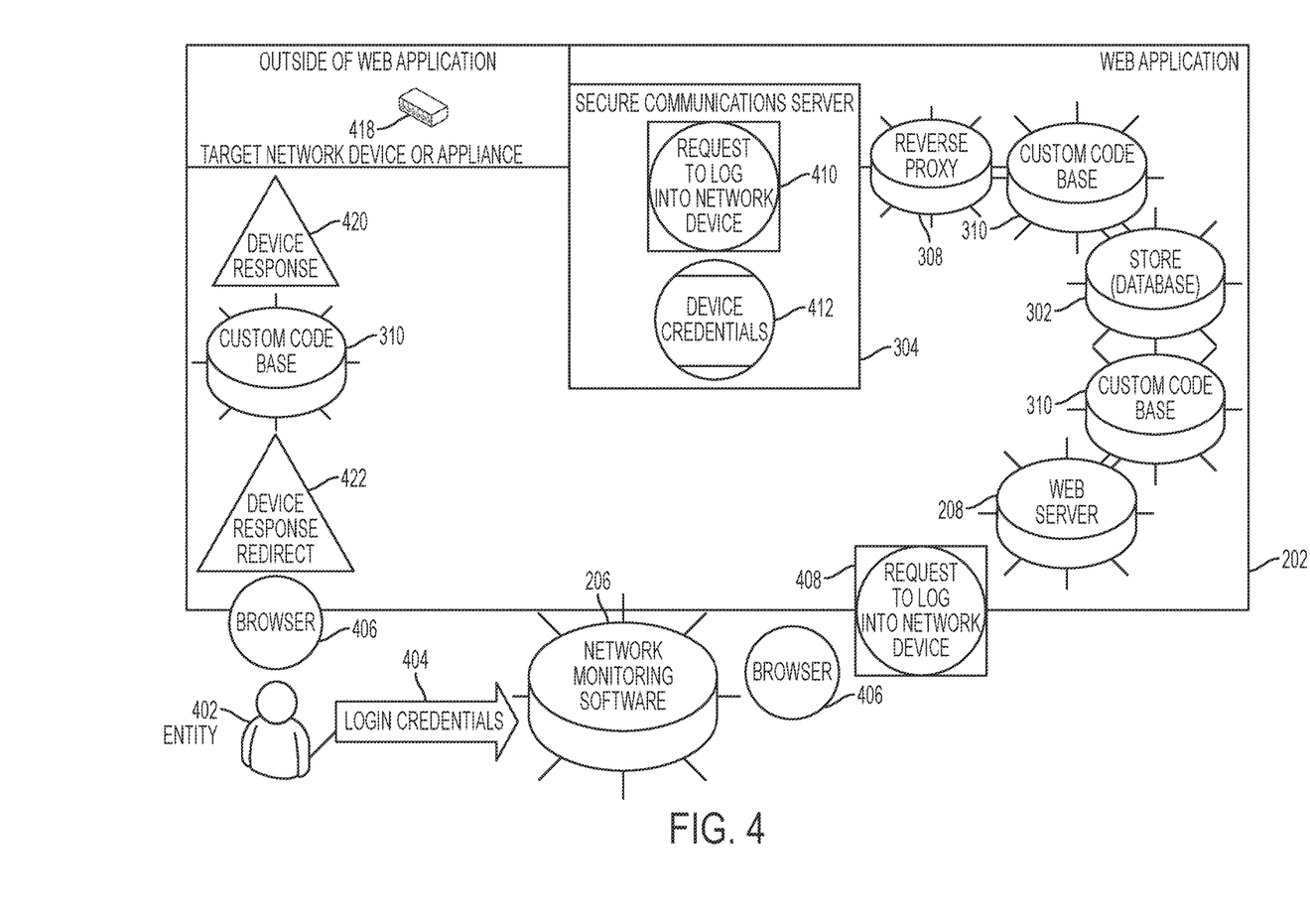
FIG. 4 is a diagrammatic representation illustrating a process involved in implementing the system in accordance with an embodiment of the present invention.

FIG. 4 is a diagrammatic representation illustrating the work flow of the systems described above in accordance with an embodiment of the present invention. An entity 402 represents an administrator, field technician, the owner of the network and/or target device(s) who might not possess any IT expertise, a manufacturer of an IP-addressable appliance who has been granted permissible access, or other persons or entities that have been granted login credentials to the central server. Login credentials 404 is the username and password credentials that the admin 114 (FIG. 1) has assigned to entity 402 to access network monitoring software 206.

A Request to Log into a Network Device 408 is a piece of data that contains the network monitoring software's identifier as described above with respect to FIG. 2, for each network device and the entity's desired activity. A Request to Log into a Network Device 410 is similar in nature to request 408.

Device Credentials 412 is stored within database 302 and contains the IP address location, port settings, and authentication credentials of a target network device 418. Network device 418 represents any applicable network device, as described above, such as devices 106, 108, 134, and 136 of FIG. 1.

A Device Response 420 is a locally hosted web interface, which may be defined as a locally hosted website that contains a management interface for managing the device and/or providing the device's functionality. A Device Response Redirect 422 is similar in nature to Device Response 420, but has been modified by codebase 310 to remove any targeted device authentication credential identifications and is sent on web browser 406 to be used by entity 402 as described herein.

Request to Log into Network Device 418 is handled uniquely by web application 202 depending on the content, destination, and source of the request (see Table 1, below). For example, the external communication from the user-to-device to the web application enters the web application through secure communications server 304 and to custom codebase 310. Custom codebase 310 acts as a librarian and looks throughout database 302 for the device's corresponding device locations, device login/authentication credentials, device login methodology, port settings, user login/authentication credentials, user action logs, and/or user's network access level permission. Once the correct credentials have been located, custom codebase 310 transmits the credentials to the target device via reverse proxy 308 over a secure communications tunnel through secure communications server 304.

TABLE 1

| SOURCE | DESTINATION | REQUEST CONTENT | WEB APPLICATION ENTRY POINT |
| --- | --- | --- | --- |
| User | User | Log-in | Reverse proxy |
| Admin | Device | Access device | Custom Codebase |
| Server | Server | Configure device | Secure comm. Server |
| Reverse proxy | Store | Forward request | |
| Device | Reverse proxy | | |
| Web browser | Web browser | | |

Referring to FIGS. 1 through 4, the remote user logs into central server 120 via a terminal and uses the terminal operating system user authentication credentials to be authenticated onto the server, where the remote user authentication credentials are defined as a unique username and password supplied by the admin that the user uses to log into their operating system user account. Network monitoring software 206 validates the remote user onto the network monitoring software, based on the admin-supplied credentials for the user's operating system user account. These credentials have been assigned to the remote user by the administrator, where the credentials are administered within network monitoring software 206, and the remote user has been assigned a given level of permissible access within the network monitoring software by the administrator.

Once logged into network monitoring software 206, the remote user determines the targeted network device with which (s)he wishes to interact, from a network monitoring software dashboard GUI that displays all of the networks and devices available to the remote user to view based on the user's level of permissible access, as defined by the admin. The remote user determines the targeted network device to which (s)he desires to connect by identifying the icon or other targeted network device locator methodology illustrated on the network monitoring software GUI or otherwise displayed on the network monitoring software dashboard by and clicking a launch button. The launch button may be a hyperlink, a form button, or any other selectable indicia presented by the GUI, as should be understood in the art. Network monitoring software 206 forwards the remote user's request via the browser to the web application. Web application 202 receives this request, determines the login credentials for the target network device by identifying the network device's object identifier as defined by the network monitoring software, and, using this identifier, retrieves the device login credentials from database 302. It then forwards the login credentials to remote server 104 via secure communication path 146 over Internet 148.

Remote server 104 redirects the login credentials via secure communication path 110 to the target device, such as network device 106. Target device 106 responds to central server 120 via secure communication path 146 over Internet 148, where the response is redirected via reverse proxy 308 to the web browser 406 that is viewed on terminal 142. As a result, remote user 140 gains access to the target device's interface, without the need of, or access to, the knowledge of the target device's authentication credentials, IP address, or port setting(s).

The GUI may be a web page, Telnet, FTP connection, standalone program, or any other suitable means. A web page may be defined as a document or resource of information that is suitable for the World Wide Web and can be accessed through a web browser and displayed on a computer screen. Telnet, or teletype network, may be defined as a network protocol used on the Internet, WANs, or LANs to provide a bidirectional interactive communications facility. FTP is a file transfer protocol defined as a standard network protocol used to exchange and manipulate files over a TCP/IP based network, such as the Internet.

This process of a remote user being able to access network devices without needing the knowledge of the device's credentials, IP address, or port setting(s) may be replicated across multiple devices and networks, without the remote user being prompted for user login credentials by each targeted device. This provides the remote user with the ability to connect to multiple devices and networks using only one initial login to the user's network monitoring software rather than prompting the user with each device's web interface for its unique login credentials. Multiple users may access the central and remote servers described herein simultaneously.

It should be understood that the above description provides a process that creates a unique security benefit by changing the methodology for remote device login and management of remote device credentialing. As noted above, devices would have to be individually port forwarded, sometimes referred to as port mapping, which may be defined as the act of forwarding a network port from one network node to another. Now, all devices are accessed through one portal or port, reducing the network's overall external exposure. Each device previously required its own port opening. Now, all devices use the same port opening, and the unique security benefit of this aspect is that all device credentials are centrally managed within central server 120 and can be configured to be a unique and safe username-password combination, in order to thwart common password guessing software.

For example, Cain and Abel, (sometimes referred to simply as "Cain") is a password tool that can determine many kinds of passwords using methods such as network packet sniffing. It can crack various password hashes by using methods such as dictionary, brute force, and cryptanalysis attacks. It also prevents the common practice of network administrators or users having to resort to using simple password schema that leaves no method to restrict access to previously authorized users or simple password schema that are easily broken by cyber criminals.

Another security benefit of this aspect of the invention is that users who are given access to the network and devices, no longer gain knowledge of the device credentials, IP address, or port settings, so their access can be managed, monitored, and logged. As a result, the risk of inside cybercrime threats is reduced significantly. Once a remote user is determined to be an unauthorized entity or is determined to no longer need access to some or all network(s) or device(s), their network software login credentials can be eliminated or modified by the administrator, thereby preventing the user from gaining documentable access credentials of specified network(s) or device(s).

An analogy would be that in the current art of the field, there were multiple doors (ports) for each person (entity) wanting to enter the house (the network), with only one key pattern (login credentials) shared among all of the doors and all of the people, each with the same key and access to any door. Having so many doors presented a large target for thieves who just had to get past one of the many doors to enter the home, or, any person who became unauthorized could enter another person's door and not be held accountable. Now, the systems and methods disclosed herein allow there to be only one door, and the key is held by the butler (that is, web application 202). Each person has to request that the butler unlock the door for them, and no person ever has access to the key pattern.

The remote user gains the unique capability of accessing a single location via the web browser of device-specific resources, such as manufacturer's digitally stored, web accessible user manuals and photos of the device in its environment and/or physical location, which are contained in the database, to aid the remote user in troubleshooting network devices.

The onsite user gains all of the benefits of the remote user as described above, with the only difference being the methodology used to access the remote server and the onsite user's ability to only access those devices located on the same network as the remote server they have logged into. For instance, onsite user 124 logs in to remote server 130 via terminal 126 over a secure remote access methodology 128.

Another embodiment of the security benefits of the invention is that an onsite user that has physical access to the network devices is unable to log into the devices outside of the system because they lack the knowledge of the device's login credentials. This leaves the onsite user dependent on the system and method disclosed herein in order to access any network devices.

Administrator 114 gains all of the benefits of the remote user as described above, in addition to the ability to perform common administrative tasks as described below. Admin 114 logs into central server 120 via terminal 116 that connects to the central server using secure remote access methodology 118. The admin's common tasks when logged into the server include, but are not limited to, editing the contents of database 302, allowing the admin to manage and assign user credentials, levels of permissible access, device authentication credentials, and/or device port settings. The admin can also act as a remote user, onsite use, or entity and can access any of the devices networked to the remote servers to configure the devices or to use their underlying functionality. The admin can also view other user's user action log contained in the database's archived history, where user action log is defined as a history of a user's access to the central server, remote server(s), and/or attached network device(s).

Entity 402, defined above as any user or entity given access to the invention, uses their login credentials to log into network monitoring software 206. Once logged into the network monitoring software, the entity determines the targeted network device or appliance from a network monitoring software dashboard GUI that displays all of the networks and devices available to the entity, as defined by the admin.

Entity 402 determines the targeted network device or appliance to which (s)he desires to connect by identifying and activating the icon illustrated on the network monitoring software GUI corresponding to the device. The launch button brings up web browser 406, which in turn launches web application 202. Web application 202 takes the Request to Log into a Network Device 408 in via the web server 208 over a reverse proxy 308. The request is then compared by custom codebase 310 to the table of devices and credentials within database 302, until a match is found. The corresponding device credentials are then added to the Request to Log into Network Device 410 and sent to target network device or appliance 418 via secure communications server 304. A Device Response 420 from target network device or appliance 418 is then sent back to custom codebase 310, which in turn modifies the device response to remove login credentials and forwards a modified device response 422 to web browser 406 for entity 402 to view on terminal 142.

Additionally, the codebase is able to contextually determine the entity's corresponding level of permissible access between the network monitoring software and the web application admin-defined user group by comparing the user's login credentials archived in the database to those presented by the entity during the network monitoring software login. For example, a field technician who logs into the network monitoring software and is recognized and credentialed as a member of the group, such as a field technician who targets IP camera 108 for routine maintenance. The field technician would be granted access to power cycle the device, but would not have the ability to view the device's web page content. This prevents the technician from looking at the video feed of the camera, while maintaining the ability to fix common repair issues, thereby providing an increased level of security and privacy.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope of the appended claims and their equivalents.

What is claimed is:

1. A method for providing a user of a plurality of users with remote access to a network device via a computer system that comprises a processing device and a database accessible by the processing device, and that is configured to communicate with the network device via a first network and with a user of the plurality of users via a second network, wherein the database stores computer-accessible program code and a web application, the method comprising the steps of:

receiving, at the web application via the second network, a login request from a first user of the plurality of users that includes a login credential;

validating the login credential received from the first user at the login request receiving step against a predetermined login credential that is unique to the first user with respect to login credentials among other users of the plurality of users;

receiving, at the web application via the second network, a request from the first user for access to the network device;

retrieving from the database a login credential for the network device that is common to the plurality of users and that is sufficient to log in to the network device;

forwarding the login credential of the network device retrieved from the database to the network device via the first network;

thereafter receiving a response from the network device; and providing the first user access, by the web application via the second network, to the response from the network device without providing the first user access to the login credential retrieved from the database, wherein the first network and the second network include the Internet.

2. The method of claim 1, wherein the login request receiving step is distinct from and occurs before the access request receiving step.

3. The method of claim 2, wherein, after the login request receiving step and before the access request receiving step, the method includes the step of retrieving access permission rights for the first user, and the login credential forwarding step is performed based on whether the access permission rights identify the first user as having permission to access the network device.

4. The method of claim 2, wherein, after the login request receiving step and before the login credential forwarding step, the method includes the step of presenting to the user, via a user interface and the second network, a query to identify a device for which access is requested, and the access request receiving step comprises receiving from the user, via the user interface, a selection of the network device.

5. The method of claim 4, wherein the query comprises a list of devices for which predetermined access permission rights indicate that the user has permission to access, the list including the network device.

* * * * *